United States Patent
Forster et al.

(10) Patent No.: US 8,863,084 B2
(45) Date of Patent: Oct. 14, 2014

(54) METHODS, APPARATUSES, AND COMPUTER-READABLE MEDIA FOR COMPUTING CHECKSUMS FOR EFFECTIVE CACHING IN CONTINUOUS DISTRIBUTED BUILDS

(75) Inventors: Michael Forster, München (DE); Ulf Adams, Munich (DE); Steffi Scherzinger, Munich (DE); Christian Karl Kemper, Santa Cruz, CA (US)

(73) Assignee: Google Inc., Mountain View, CA (US)

( * ) Notice: Subject to any disclaimer, the term of this patent is extended or adjusted under 35 U.S.C. 154(b) by 158 days.

(21) Appl. No.: 13/284,432

(22) Filed: Oct. 28, 2011

(65) Prior Publication Data
US 2013/0111440 A1    May 2, 2013

(51) Int. Cl.
G06F 9/44    (2006.01)

(52) U.S. Cl.
CPC ..................... *G06F 8/71* (2013.01)
USPC .......................................... 717/121

(58) Field of Classification Search
CPC ............. G06F 8/48; G06F 8/71; G06F 8/20; G06F 8/61; G06F 8/36; G06F 9/44505
USPC .......................................... 717/121
See application file for complete search history.

(56) References Cited

U.S. PATENT DOCUMENTS

| | | | |
|---|---|---|---|
| 4,558,413 A * | 12/1985 | Schmidt et al. | 717/170 |
| 6,272,536 B1 * | 8/2001 | van Hoff et al. | 709/217 |
| 7,707,642 B1 | 4/2010 | Herbach et al. | |
| 8,145,983 B1 * | 3/2012 | Chaichanavong et al. | 714/796 |
| 8,424,102 B1 * | 4/2013 | Herbach et al. | 726/27 |
| 2003/0126504 A1 * | 7/2003 | Ryan et al. | 714/37 |
| 2005/0160312 A1 | 7/2005 | Seng et al. | |
| 2005/0166094 A1 | 7/2005 | Blackwell et al. | |
| 2005/0267902 A1 * | 12/2005 | Thurnhofer et al. | 707/100 |
| 2007/0168955 A1 * | 7/2007 | Nicol et al. | 717/120 |
| 2011/0258516 A1 * | 10/2011 | Salmon-Legagneur et al. | 714/768 |

OTHER PUBLICATIONS

International Search Report dated Jan. 9, 2013 for International Application No. PCT/US 12/62095.
Written Opinion of the International Searching Authority dated Jan. 9, 2013 for International Application No. PCT/US 12/62095.
Written Opinion of the International Preliminary Examining Authority dated Oct. 25, 2013 for International Application No. PCT/US12/62095.

* cited by examiner

*Primary Examiner* — Li B Zhen
*Assistant Examiner* — Hui-Wen Lin
(74) *Attorney, Agent, or Firm* — Birch, Stewart, Kolasch & Birch, LLP (57) ABSTRACT

Methods, systems, and computer-readable media for determining whether dependencies of configuration files have changed such that the compilation strategy should be recomputed. Local build checksums are computed for individual configuration files. The local build checksums are computed by sorting input paths to the configuration files plus data indicating whether the path refers to a file or a directory and a checksum computed on the configuration file itself. The transitive closure of local build checksums are then used to compute a global build checksum: the local build checksums are sorted in order to compute the global build checksum. If the global build checksum is different from a previously computed global build checksum, then the compilation strategy should be recomputed, since this is a signal that the compilation strategy may not be valid anymore, e.g. because some dependencies in the configuration files have changed.

24 Claims, 7 Drawing Sheets

METHODS, APPARATUSES, AND COMPUTER-READABLE MEDIA FOR COMPUTING CHECKSUMS FOR EFFECTIVE CACHING IN CONTINUOUS DISTRIBUTED BUILDS

FIELD OF ENDEAVOR

Aspects of the present invention relate to methods, systems, and computer-readable media to build software. Specifically, aspects of the present invention relate to computing checksums to determine whether a compilation strategy computed for an earlier configuration file may be reused for a later configuration file.

BACKGROUND

In developing software it is often first written as programming code in a programming language that humans may readily understand. The programming code then goes through a process of compilation in order to create executable code that computers may readily understand. A compiling and linking process is performed in order to generate the executable code. Computers follow the instructions in the executable code in order to perform all computer functions, including displaying user interfaces, connecting to the Internet, and performing other computing tasks such as enabling word processing and web browsing, providing web services, etc.

Programmers use an editor similar to a word processing program in order to write computer software. The editor usually allows programmers to type in their program, compile the program, and run the program in order to test it. In order to manage large software programs, the programs are often divided into separate units called modules. A module is computer code that is written to handle one or more related tasks and the code may often be managed together as a single unit. Different modules may then be written to manage particular tasks. For example, to write a web browsing program, there may be a module for managing bookmarks, a module to handle communications with Internet services, etc.

A software program or module written in programming code may refer to other software programs or modules. This is an efficient way to write a computer program, since it allows a computer programmer to reference already created code and thus does not have to re-create all code from scratch. Instead, the computer programmer is able to incorporate, or depend on, portions of libraries of code that may have been previously written by others. The programmer can then focus on writing the operative parts of their own specific software module.

In generating executable code from programming code, the code generator needs to know the order in which to compile modules. A first module that relies on a second module should be compiled after the second module. Programmers write configuration files in order to inform the code generator which configuration files rely, or depend on, other configuration files. A configuration file is a document declaring the dependencies of the modules, in order so that the code generator may properly order the compilation of modules. Configuration files thus declare the dependencies of software modules. The dependencies of software modules may affect the ordering in which modules are compiled. In some cases, modules do not depend on each other and therefore may be compiled in parallel.

Traditionally, a module is defined as a set, wherein the items are single files and/or other modules. If there is a change to any of the items in a module, the complete module needs to be re-compiled. Consequently, all modules depending on a particular module being re-compiled need to be re-compiled as well. Further, a compilation plan with a strategy for compiling, linking and other tasks is re-computed every time the modules are re-compiled.

Such re-compilations can be computationally expensive for large software products, costing valuable time and resources. A better technique of re-compilation to reduce the computational expense is therefore desired. In one approach, timestamps of files are examined to determine whether re-compilation is necessary. If the timestamp has not changed since a previous compilation, then the compilation process may be skipped since there has been no updates or changes to a software module. However, one drawback of such an approach is if the timestamps are not updated, then the changes to the programming code in the software module would not be updated in the executable code. Further, glitches in timestamps, e.g. when machines have different times, can lead to non-hermetic builds where some dependencies are not included, leading to undesirable results. In light of such drawbacks, a better approach to reducing the computational expense of re-compilation is sought.

SUMMARY

In one aspect of the present invention, the invention may include a method performed by a data processing apparatus, including creating a first compilation strategy for a first build; performing the first build using the first compilation strategy; computing a first checksum for the first build; storing the first compilation strategy and the first checksum; computing a second checksum for a second build; determining if the second checksum is equal to the first checksum; in response to determining that the second checksum is not equal to the first checksum, creating a second compilation strategy; storing the second compilation strategy and the second checksum, and performing the second build using the second compilation strategy; and in response to determining that the second checksum is equal to the first checksum, retrieving the first compilation strategy and performing the second build using the first compilation strategy.

In a further aspect of the present invention, the method includes wherein the first checksum is a global build checksum; and the global build checksum is computed using one or more local build checksums.

In a further aspect of the present invention, the method includes determining that a local build checksum computed for the first build has not changed for the second build, and reusing parts of the first compilation strategy associated with the local build checksum in the second compilation strategy.

In a further aspect of the present invention, the method includes wherein file system information is sorted by pathname in order to compute local build checksums.

In a further aspect of the present invention, the method includes wherein the file system information includes a checksum.

In a further aspect of the present invention, the method includes wherein performing the first build using the first compilation strategy further includes examining the contents of a configuration file to determine dependencies; and computing a local build checksum for each dependency of the configuration file.

In a further aspect of the present invention, the method includes computing a transitive closure based on dependencies of the configuration files.

In a further aspect of the present invention, the method includes wherein a local build checksum is computed for each configuration file of the computed transitive closure.

In a further aspect of the present invention, the method includes wherein the checksum is computed using an XOR function.

In a further aspect of the present invention, the method includes wherein computing the first checksum further includes performing a deterministic sorting; computing a local build checksum with the deterministic sorting; and computing the first checksum using the local build checksum, the first checksum being a global build checksum.

In another aspect of the present invention, the invention may include a system including one or more computers; a computer-readable medium coupled to the one or more computers having instructions stored thereon which, when executed by the one or more computers, causes the one or more computers to perform operations including: creating a first compilation strategy for a first build; performing the first build using the first compilation strategy; computing a first checksum for the first build; storing the first compilation strategy and the first checksum; computing a second checksum for a second build; determining if the second checksum is equal to the first checksum; in response to determining that the second checksum is not equal to the first checksum, creating a second compilation strategy; storing the second compilation strategy and the second checksum, and performing the second build using the second compilation strategy; and in response to determining that the second checksum is equal to the first checksum, retrieving the first compilation strategy and performing the second build using the first compilation strategy.

In a further aspect of the present invention, the system includes wherein the first checksum is a global build checksum; and the global build checksum is computed using one or more local build checksums.

In a further aspect of the present invention, the computer-readable medium of the system includes additional instructions stored thereon that, when executed by the one or more processors, causes the one or more processors to perform additional operations including determining that a local build checksum computed for the first build has not changed for the second build, and reusing parts of the first compilation strategy associated with the local build checksum in the second compilation strategy.

In a further aspect of the present invention, the system includes wherein file system information is sorted by pathname in order to compute local build checksums.

In a further aspect of the present invention, the system includes wherein the file system information includes a checksum.

In a further aspect of the present invention, the system includes wherein performing the first build using the first compilation strategy further includes examining the contents of a configuration file to determine dependencies; and computing a local build checksum for each dependency of the configuration file.

In a further aspect of the present invention, the computer-readable medium of the system includes additional instructions stored thereon that, when executed by the one or more processors, causes the one or more processors to perform additional operations including computing a transitive closure based on dependencies of the configuration files.

In a further aspect of the present invention, the system includes wherein a local build checksum is computed for each configuration file of the computed transitive closure.

In a further aspect of the present invention, the system includes wherein the checksum is computed using an XOR function.

In a further aspect of the present invention, the system includes wherein computing the first checksum further includes performing a deterministic sorting; computing a local build checksum with the deterministic sorting; and computing the first checksum using the local build checksum, the first checksum being a global build checksum.

In another aspect of the present invention, the invention may include a computer-readable medium coupled to one or more processors having instructions stored thereon that, when executed by the one or more processors, causes the one or more processors to perform operations including creating a first compilation strategy for a first build; performing the first build using the first compilation strategy; computing a first checksum for the first build; storing the first compilation strategy and the first checksum; computing a second checksum for a second build; determining if the second checksum is equal to the first checksum; in response to determining that the second checksum is not equal to the first checksum, creating a second compilation strategy; storing the second compilation strategy and the second checksum, and performing the second build using the second compilation strategy; and in response to determining that the second checksum is equal to the first checksum, retrieving the first compilation strategy and performing the second build using the first compilation strategy.

In a further aspect of the present invention, the computer-readable medium includes wherein the first checksum is a global build checksum; and the global build checksum is computed using one or more local build checksums.

In a further aspect of the present invention, the computer-readable medium includes additional instructions stored thereon that, when executed by the one or more processors, causes the one or more processors to perform additional operations including determining that a local build checksum computed for the first build has not changed for the second build, and reusing parts of the first compilation strategy associated with the local build checksum in the second compilation strategy.

In a further aspect of the present invention, the computer-readable medium includes wherein file system information is sorted by pathname in order to compute local build checksums.

In a further aspect of the present invention, the computer-readable medium includes wherein the file system information includes a checksum.

In a further aspect of the present invention, the computer-readable medium includes wherein performing the first build using the first compilation strategy further includes examining the contents of a configuration file to determine dependencies; and computing a local build checksum for each dependency of the configuration file.

In a further aspect of the present invention, the computer-readable medium includes additional instructions stored thereon that, when executed by the one or more processors, causes the one or more processors to perform additional operations including computing a transitive closure based on dependencies of the configuration files.

In a further aspect of the present invention, the computer-readable medium includes wherein a local build checksum is computed for each configuration file of the computed transitive closure.

In a further aspect of the present invention, the computer-readable medium includes wherein the checksum is computed using an XOR function.

In a further aspect of the present invention, the computer-readable medium includes wherein computing the first checksum further includes performing a deterministic sorting; computing a local build checksum with the deterministic sorting; and computing the first checksum using the local build checksum, the first checksum being a global build checksum.

Further scope of applicability of the methods, apparatuses, and computer-readable storage mediums discussed will become apparent from the detailed description given hereinafter. However, it should be understood that the detailed description and specific examples, while indicating embodiments, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings which are given by way of illustration only, and thus are not limitative, and wherein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

OVERVIEW

When users (e.g. computer programmers) want to create executable code from programming code, they initiate the build process on a build server computing system, which creates a plan (i.e. the compilation strategy) for compiling the programming code. The build server computing system may be any computing system that can perform the build process. During the build process, the build modules may process the configuration files in order to determine a compilation strategy. The configuration files that are initially processed may refer to other configuration files. In some embodiments, the referred-to configuration files are processed prior to the referring configuration file. Some of the configuration files are processed in serial order, and others may be processed in parallel. The build server uses the contents of the configuration files to determine the compilation strategy. In some cases, the compilation strategy does not change from a previous computation strategy. For example, in some cases, the dependencies in the configuration file may not have changed, and so the compilation strategy does not change. In order to save time and reduce the waste of computational resources, the compilation strategy should be reused if possible.

To detect whether a compilation strategy can be re-used, we introduce the notion of "global build checksums". Intuitively, this is a value that captures the state of the build input and its dependencies. When this value does not change, it is safe to re-use the previous compilation strategy. If this value changes, it is not safe to re-use the previous compilation strategy. By comparing a global build checksum computed for a current global build with a previous global build checksum for a previous global build, the build server can determine that reusing the compilation strategy is possible.

A "checksum" is a value computed using an algorithm for any data. The value of the checksum changes for a subsequent computation if the data changes. Such data might be, for example, data representing a configuration file. In some embodiments, an algorithm used to compute the checksum is the MD5 algorithm. Embodiments of the invention are not limited to using the MD5 algorithm. Other algorithms may also be used for computing the checksum. If the checksums of two configuration files are different, then the contents of the two configuration files are different. Furthermore, since a checksum may be computed for any data, a checksum may also be computed for a collection of configuration file checksums.

In an embodiment of the present invention, a global build checksum is determined for a set of local build checksums. If the global build checksum for a later build is different from the global build checksum for an earlier build, then the compilation strategy of the later build may have to be different from the compilation strategy of the earlier build. Because the global build checksum incorporates checksums of the local builds, the global build checksum reflects any changes that take place in the local builds. Thus, it is possible to detect changes in the dependencies of the local builds using the local build checksum, and also possible to detect the changes using the global build checksum. For example, in an embodiment, if a file is deleted, and a directory is created using the same name as the file, then the compilation strategy (also referred to as the build strategy) should be recomputed. In such an embodiment, the local build checksum should be different when computed, due to the change from file to directory.

In some embodiments, portions of a compilation strategy computed for an earlier build may be reused in a compilation strategy for a later build, even if the if the earlier build and the later build have different global build checksums. The checksums (e.g. local build checksums) may be examined in order to determine which parts of the earlier build may be reused. The parts of the first build and the parts of the second build that have the same first local build checksum and the same second local build checksum may be reused. Thus, parts of the first compilation strategy can be re-used even if the first global checksum and second global checksum differ.

In an embodiment, the set of local build checksums that may be used for computing the global build checksum are computed based on the configuration files $\{b\_1, b\_n\}$ in the "transitive closure" of the configuration files. A "set" is a collection of things. The notation $b\_1$ used herein may be understood as the first b ("$b\_1$"), the second b ("$b\_2$"), the n-th b ("$b\_n$"), etc. Formally, the transitive closure of a directed graph $G=(V,E)$, V being the set of vertices and E being the set of edges, is a graph $G+=(V,E+)$ such that for all v, w in V there is an edge (v,w) in E+ if and only if there is a non-null path from v to w in G. The transitive closure includes every vertex and edge that is reachable from a node in a directed graph.

The transitive aspect of the "transitive closure" terminology basically means for a pair of nodes X and Y, if there is a directed edge from X to Y in graph G, and if there is a pair of nodes Y and Z, and if there is a directed edge from Y to Z in graph G, there is also a directed edge from X to Z in graph G+.

The "closure" aspect is best understood by describing the collection of vertices. We start out with a set containing the single vertex R, then we collect all edges (X,Y) from the graph that satisfy X=R which gives us additional vertices (the Y's of the (X,Y) pairs). which we also add to the original set. We then keep repeating this for all elements of the set until there are no more edges in the graph to add at which point we have reached the closure. We have basically connected every vertex in the graph that can be reached from the original vertex R along the existing edges in the graph.

For example, here is one set of flights between cities in the USA: {(Seattle, Chicago), (Chicago, New York)}. Here is an example transitive closure for the same cities: {(Seattle, Chicago), (Chicago, New York), (Seattle, New York)}. (Seattle, New York) is a part of the set of the transitive closure, because (Seattle, Chicago) and (Chicago, New York) exists in the original set. In terms of configuration files, if build A depends on build B, i.e. (A,B), and build B depends on build C: i.e. (B,C), then (A,C) is also part of the transitive closure.

Using the transitive closure of configuration files, the build module can determine whether there have been changes to any of the dependencies between configuration files. Build module 114 can determine whether there has been changes to any of the inputs to configuration files or whether dependencies have been changed such that the compilation strategy should be re-computed, according to an embodiment of the invention.

Because the build module can determine whether there have been any changes to the configuration files, including the dependencies between configuration files, the build module can skip the step of creating the compilation strategy when there are no changes that would affect the validity of the compilation strategy. Software engineers are no longer delayed in waiting for the re-computation of the compilation strategy when the compilation strategy does not need to be changed. Build strategies can be re-used across different programmers. The reuse of a previously created compilation strategy saves much computational time and expense, especially in a large company where many builds are performed frequently.

Figure 1:
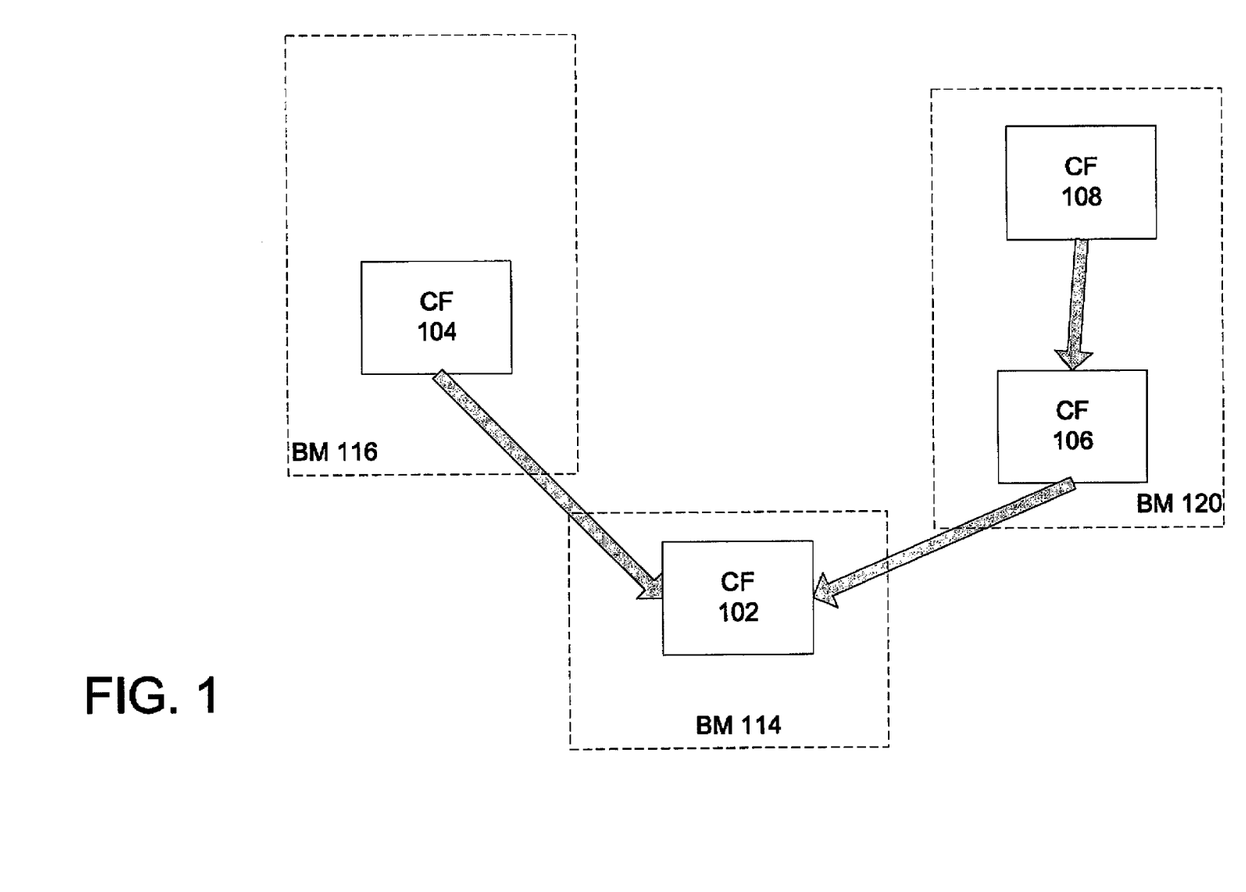
FIG. 1 is a block diagram illustrating example dependencies of configuration files, according to an embodiment.

FIG. 1 is a block diagram illustrating example dependencies of configuration files, according to one embodiment. As illustrated in FIG. 1, a configuration file (CF) 102 refers to, and depends on, CF 104 and 106. CF 106 depends on CF 108. In one embodiment, CF 108 is processed before processing CF 106. CF 104, 106, and 108 may be processed before processing CF 102. Configuration files declare the dependencies of software modules. Each of the configuration files may be processed by a build module (BM). For those configuration files that refer to other configuration files, and are dependent on the other configuration files, the build module may also load the other configuration files.

The build module may be a server executing software to perform the building process. As illustrated in FIG. 1, CF 102 may be processed by a BM 114. CF 104 may be processed by a BM 116. CF 106 and CF 108 may be processed by a BM 120. In some embodiments, one or more of the separate build modules may be implemented as a single build module. In some embodiments, all of the separate build modules may be implemented as a single build module. For example, BM 114 may also be a single build module that performs the building process for all of the configuration files. For simplicity of description, the one or more build modules that perform the actions described herein are described as being performed by BM 114, but in different embodiments, any number or combination of build modules, such as BM 114 in conjunction with BM 116 and BM 120, may perform the processes described herein.

Construction of a Compilation Strategy

Figure 2:
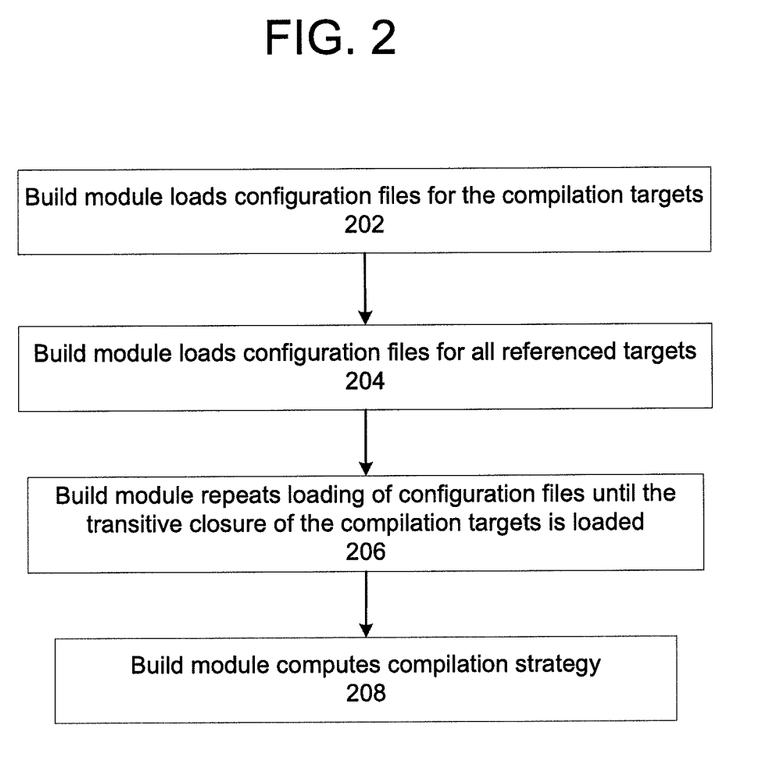
FIG. 2 is a flow diagram illustrating steps for construction of a compilation strategy, according to an embodiment

FIG. 2 is a flow diagram illustrating steps for construction of a compilation strategy, according to an embodiment.

In step 202, build module 114 loads configuration files for the compilation targets. Build module 114 loads an initial set of configuration files. These configuration files are the top level configuration files and some of the configuration files may depend on other configuration files. For example, build module 114 may load configuration file CF 102 of FIG. 1.

In step 204, build module 114 loads configuration files for all referenced targets. Build module 114 also loads other configuration files that are referred to by the initially loaded set of configuration files. Build module 114 examines the contents of the initially loaded set of configuration files in order to determine the other configuration files for loading. For example, build module 114 (or build module 120 in some embodiments) may load CF 104 and CF 106, because these configuration files are referenced by CF 102.

In step 206, build module 114 repeats loading of configuration files until the transitive closure of the compilation targets is loaded. For example, build module 114 (or build module 120 in some embodiments) may load CF 108 based on a dependency link from CF 106. In some embodiments, to load the transitive closure, if a configuration file A refers to a configuration file B, and the configuration file B also refers to a configuration file C, then the configuration file C is loaded based on a connection between configuration file A and configuration file C in the transitive closure. Configuration file C is also loaded based on a connection between configuration file A and configuration file B. Build module 114 loads configuration files until all the configuration files that are referenced in any other configuration file are loaded. In this way, no dependencies are left out of the loading process and unaccounted for. The transitive closure may be computed using any conventional algorithm. The transitive closure may be computed based on dependencies of the configuration files. The dependencies may be determined by examining the configuration files. Once all the configuration files have been loaded, and when all the dependencies have also been examined, then the loading of the transitive closure of the compilation targets is completed.

In step 208, build module 114 computes the compilation strategy. The compilation strategy is a plan for the steps of compiling source code, linking object files, and other steps required for completing the compilation. Some of the steps, such as compiling certain source code, may be performed in parallel. In some cases, if two software modules are independent of each other, then the two software modules may be compiled independently. Other steps may only be performed sequentially. In some embodiments, if the compilation of one software module relies on the completion of the compilation of another software module, then the compilation steps may only be performed sequentially. The compilation strategy may specify which input and output files must be available at each stage. The compilation strategy may specify which stages of the compilation may be performed in parallel, and which stages of the compilation must be performed sequentially. The compilation strategy may also specify source code compilation, linking, and other steps to be performed. The compilation strategy may also geographically schedule work to be performed and actions to be executed in a cloud of build machines.

Determining Whether to Reuse a Previously Computed Compilation Strategy

Figure 3:
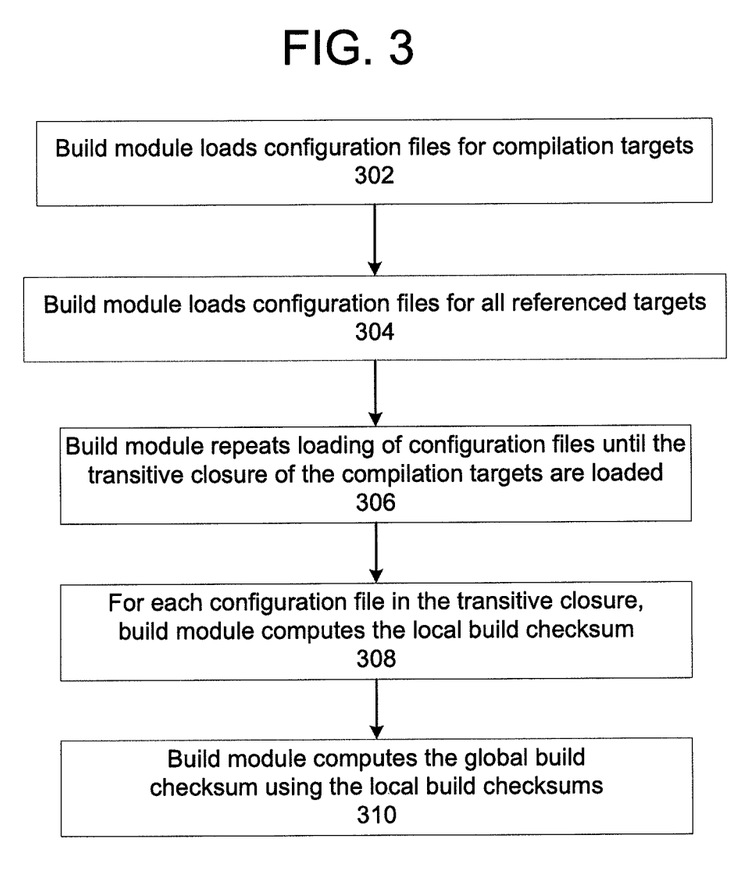
FIG. 3 is a flow diagram illustrating steps for determining whether to reuse a previously computed compilation strategy, according to an embodiment.

FIG. 3 is a flow diagram illustrating steps for determining whether to reuse a previously computed compilation strategy, according to an embodiment.

In step 302, build module 114 loads configuration files for compilation targets. This step is equivalent to step 202 of FIG. 2. Build module 114 loads an initial set of configuration files. These configuration files are the top level configuration files and some of the configuration files may depend on other configuration files. For example, build module 114 may load BF 102.

In step 304, build module 114 loads configuration files for all referenced targets. This step is equivalent to step 204 of FIG. 2. Build module 114 also loads other configuration files that are referred to by the initially loaded set of configuration files. Build module 114 examines the contents of the initially loaded set of configuration files in order to determine the other configuration files for loading. For example, build module 114 may load CF 104 and CF 106 because these configuration files are referenced in CF 102.

In step 306, build module 114 repeats loading of configuration files until the transitive closure of the compilation targets are loaded. This step is equivalent to step 206 of FIG. 2. Build module 114 loads configuration files until all the configuration files that are referenced in any other configuration file are loaded. For example, build module 114 may load CF 108.

In step 308, for each configuration file in the transitive closure, build module 114 computes the local build checksum. In order to perform step 308, build module 114 performs steps as described in FIG. 4. Build module 114 computes the local build checksums that will be used in computing the global build checksum.

Figure 5:
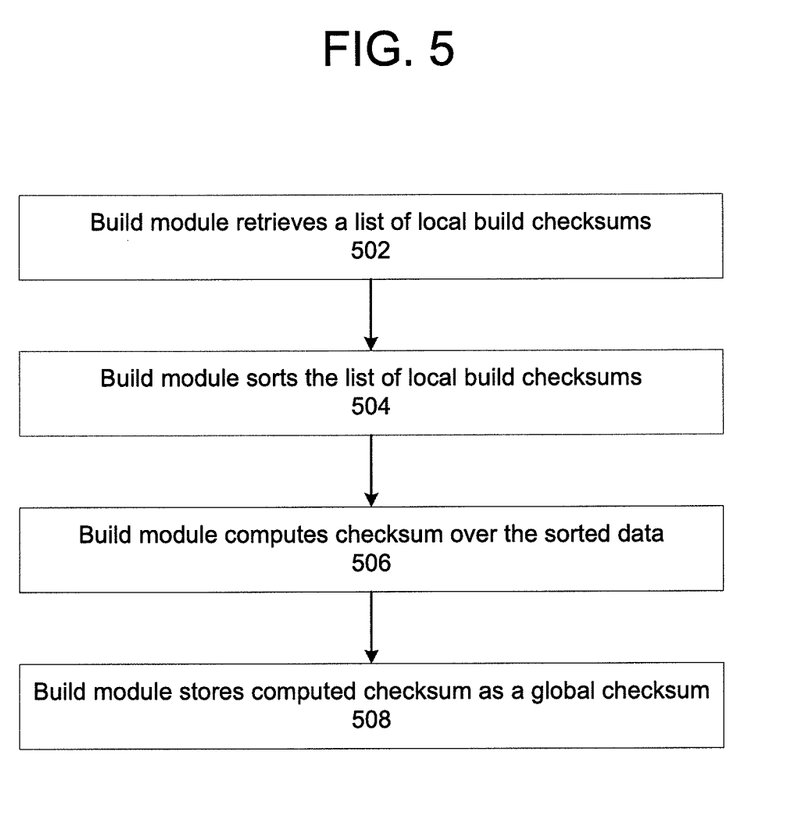
FIG. 5 is a flow diagram illustrating steps for computing a global build checksum, according to an embodiment.

In step 310, build module 114 computes the global build checksum using the local build checksums. In order to perform step 310, build module 114 perform steps as described in FIG. 5. In FIG. 5, build module 114 sorts local build checksums and computes the global build checksum using the sorted local build checksums. The global build checksum is compared to a previous global build checksum in order to determine whether a new compilation strategy is required. If the global build checksum has changed, then a new compilation strategy should be re-computed.

Computing a Local Build Checksum

Figure 4:
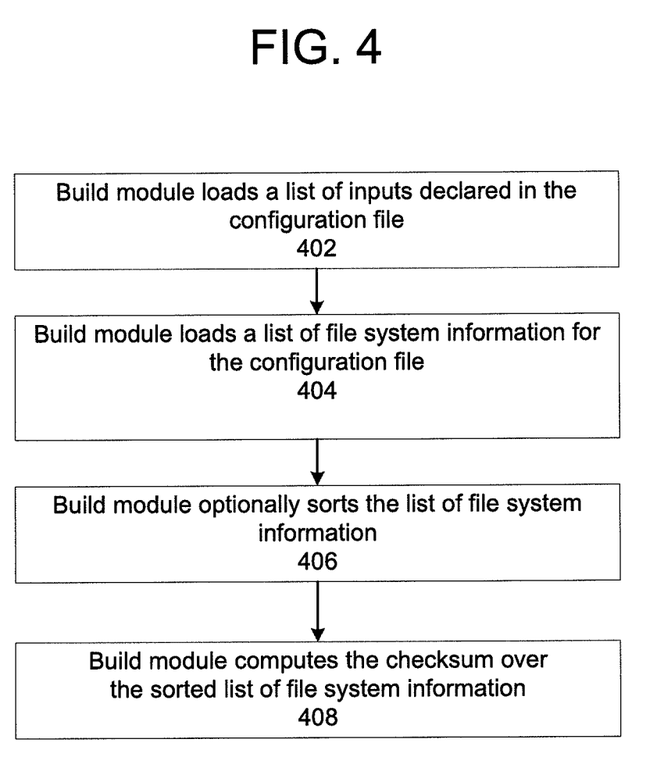
FIG. 4 is a flow diagram illustrating steps for computing a local build checksum, according to an embodiment.

FIG. 4 is a flow diagram illustrating steps for computing a local build checksum, according to an embodiment. The local build checksums may be computed for all the configuration files in the transitive closure in order to compute the global build checksum.

In step 402, build module 114 determines a list of inputs declared in the configuration file. A configuration file may reference other configuration files or directories. The referenced configuration files or directories that are declared in a configuration file may be represented as {in_1, ..., in_m}, for m references. For the example of CF 102, in_1 may be /dir3/file2, in_2 may be /dir1/file1, and in_3 may be /dir2. In some embodiments, build module 114 may determine a list of referenced configuration files or directories by examining the contents of the configuration file. In some embodiments, build module 114 may examine build files during the building process to determine which files get accessed, in order to determine the list of referenced files or directories.

In step 404, build module 114 determines a list of file system information for the configuration file. In an embodiment, the list of file system information is stored in an array file_info. For example, file_info(1) refers to the first slot of the file_info array and may store /dir3/file2, file_info(2) may store /dir1/file1, and file_info(3) may store /dir2. In some embodiments, each slot holds contents of a type structure. The type structure may include, for example, a string type representing the pathname. The type structure may also include an integer or Boolean type or some other type indicating whether the file information system slot is storing data for a file or a directory. In some embodiments, the file_info( ) slots may store all information for the files that may trigger recomputation of build steps.

Figure 6:
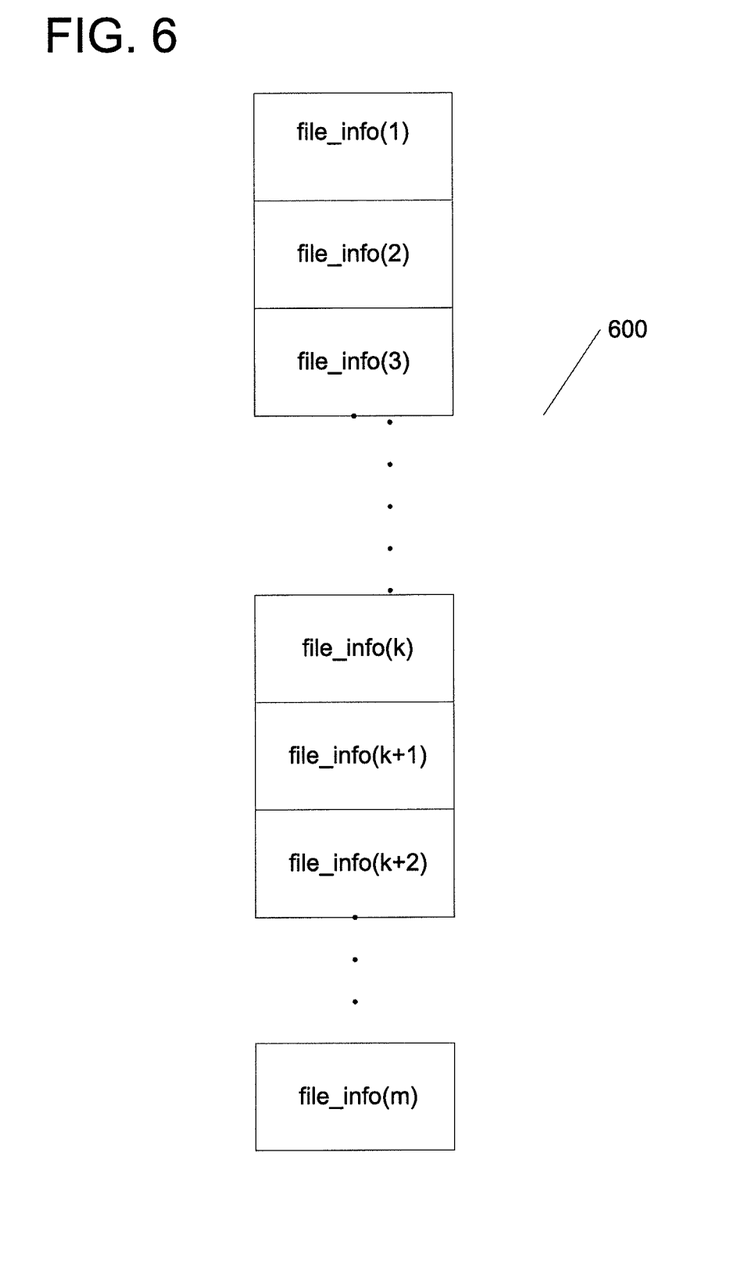
FIG. 6 illustrates a file_info array, according to an embodiment.

In an embodiment, an array file_info has m slots, as depicted in FIG. 6. The slots in file_info may each be referred to as file_info(1), file_info(2), file_info(3), . . . file_info (k), . . . file_info(m). The k represents some slot in the middle of the array. Build module 114 may examine the contents of the configuration file in order to populate the array file_info.

Each of the slots of file_info may store information about an input of the configuration file. The information that is stored may be file system information which includes a path and data indicating whether the input is a directory or a file. For each input in_k, build module 114 may assign to an array file_info the following information at the array position for in_k: 1) a path to a file and 2) data indicating whether the input is a file or a directory. For example, in one type of computing system, a path may be "C:\root\builds\configuration file 102.cf", which may be assigned to file_info(1). As another example, in another type of computing system, a path may be "/root/u/joe123/configuration file 102.cf". Other variations of path formats exist, and embodiments of the invention are not limited to particular formats of paths.

In an embodiment, the data indicating whether the input is a file or a directory may be stored in a variable. Such a variable may be a Boolean variable, an integer variable, or any other type of variable. For example file_info(1) may have a value indicating a file. If the path is a directory, i.e. "C:\root\builds\build 102" or "/root/builds/build 102", file_info(1) may also store a value indicating a directory. For example, file_info(1) may store "/dir3/file2", which is a path to a file, and may also store data indicating that file_info(1) stores a file.

In step 406, build module 114 optionally sorts the list of file system information. In an embodiment, build module 114 sorts the following together for a configuration file c_i:
1) file_info(in_k) for all inputs {in_1, ..., in_m}. In other words, the slots of file_info store, in each slot, data regarding an input of the configuration file c_i
2) checksum(c_i). In other words, the checksum value for the configuration file c_i, and
3) file_info(c_i). In other words, the file_info of the configuration file c_i, which may include the path of the configuration file c_i and data indicating that the configuration file c_i is a file. In some embodiments, the sorting may be performed using any algorithm that creates a canonical order. Canonical ordering may be achieved using deterministic sorting techniques. The sorting is deterministic if the sort returns the same results from the same inputs, even if the order of inputs changes. For example, given the following file_info slot values:

file_info(1): "/root/u/joe123/configuration file 110.cf"
file_info(2): "/root/u/joe123/configuration file 144.cf"
file_info(3): "/root/u/joe123/configuration file 122.cf"
file_info(4): "/root/u/joe123/configuration file 111.cf"
file_info data of local configuration file: "/root/u/joe123/configuration file 34.cf"
checksum of c_i local configuration file checksum(c_i): 234233

After performing the sorting, the result of the sort in the example may be: {234233, "/root/u/joe123/configuration file 34.cf", "/root/u/joe123/configuration file 110.cf", "/root/u/joe123/configuration file 111.cf", "/root/u/joe123/configuration file 122.cf", "/root/u/joe123/configuration file 144.cf"}

In step 408, build module 114 computes the checksum over the sorted list of file system information. The sorted data for calculating the local build checksum includes the file_info array with sorted values, the file_info of the configuration file $c\_i$, and the checksum over the contents of the configuration file. Build module 114 may use the sorted data result as input into an algorithm which computes a checksum. In some embodiments, build module 114 uses an MD5 algorithm to compute the checksum. For example, the input into the local build checksum calculation may include /dir1/file1, /dir2, /dir3/file2, /package1/configurationfile1, and a checksum (usually a numeric value). The checksum may be a number such as 2342342, and the checksum is different if the input to the checksum computation is different.

In some embodiments, build module 114 computes an order-independent checksum without sorting. For example, build module 114 may use an XOR function to compute the checksum. In such embodiments, build module 114 verifies that there are no duplicate entries in a list that is used for computing the checksum.

Computing a Global Build Checksum

FIG. 5 is a flow diagram illustrating steps for computing a global build checksum, according to an embodiment. Build module 114 may perform the steps of FIG. 5 in order to determine whether a previous compilation strategy may be reused. If the previous compilation strategy cannot be reused, then a new compilation strategy should be computed.

In step 502, build module 114 retrieves a list of local build checksums. In order to compute the global build checksum, build module 114 retrieves local build checksums that have been computed. The local build checksums may be from a set of configuration files $\{b\_1, \ldots, b\_n\}$ in the transitive closure. In an embodiment, each local build checksum may be a numerical value that has been computed for a particular configuration file. For example, the local build checksums that are computed for BF 104, BF 102, and BF 106—may be 980456, 234231, and 343243, respectively.

In step 504, build module 114 sorts the list of local build checksums. In some embodiments, build module 114 sorts by package name (also referred to as module name or target name). The sorting of the local build checksums by package name may result in the list of local build checksums sorted as 234231, 980456, and 343243, for example.

In step 506, build module 114 computes checksum over the sorted data. Build module 114 may process the sorted local build checksums to compute a global checksum. If the sorting algorithm is deterministic, the input to the global checksum computation is the same so long as the configuration file checksums do not change. For example, using the sorted list of local bill checksums sorted as 234231, 343243, and 980456, a computed global build checksum may be 108934.

In step 508, build module 114 stores computed checksum as a global checksum. Build module 114 may store the global checksum. Build module 114 may then compare the global checksum to the previous global checksum that was calculated in order to determine whether to create a new compilation strategy. If the global checksum is the same as the previous global checksum, the compilation strategy may be re-used. If the global checksum is different from the previous global checksum, the compilation strategy is re-computed. For example, if the previous global build checksum is 546675, and the currently computed global build checksum is 108934, then the compilation plan should be re-computed because the changed checksum indicates that the previous compilation plan may no longer be valid, e.g. because some dependencies have changed or the nature of the inputs have changed.

File_Info Array

FIG. 6 illustrates a file_info array, according to an embodiment. As illustrated in FIG. 6, file_info 600 has m slots. Each of the slots may be referred to as file_info(k), where "k" refers to the k-th slot. For example, file_info(1) refers to the first slot of the file_info array, file_info(2) refers to the second slot of the file_info array, and so on. File_info(m) refers to the last slot of the file_info array.

File System Service

In some embodiments, the computation of local build checksums and global build checksums may be added as a service to a file system. Such a file system may add little overhead for computation and monitoring this service. In such an embodiment, polling the file system for the global build checksum of a build target is computationally inexpensive, and may be performed prior to computing a compilation strategy.

The file system may perform the steps of FIG. 4 and FIG. 5. The file system may be aware of all changes as the changes occur, and may recompute any data at that time. Then at a later time, the data can be queried from the file system rather than being re-computed. A file system may compute checksums faster and cheaper than any application running in the user space. Further, compilation strategies can be cached, re-used, and the compilation may be sped up for users who work concurrently.

EXAMPLE EMBODIMENTS

Figure 7:
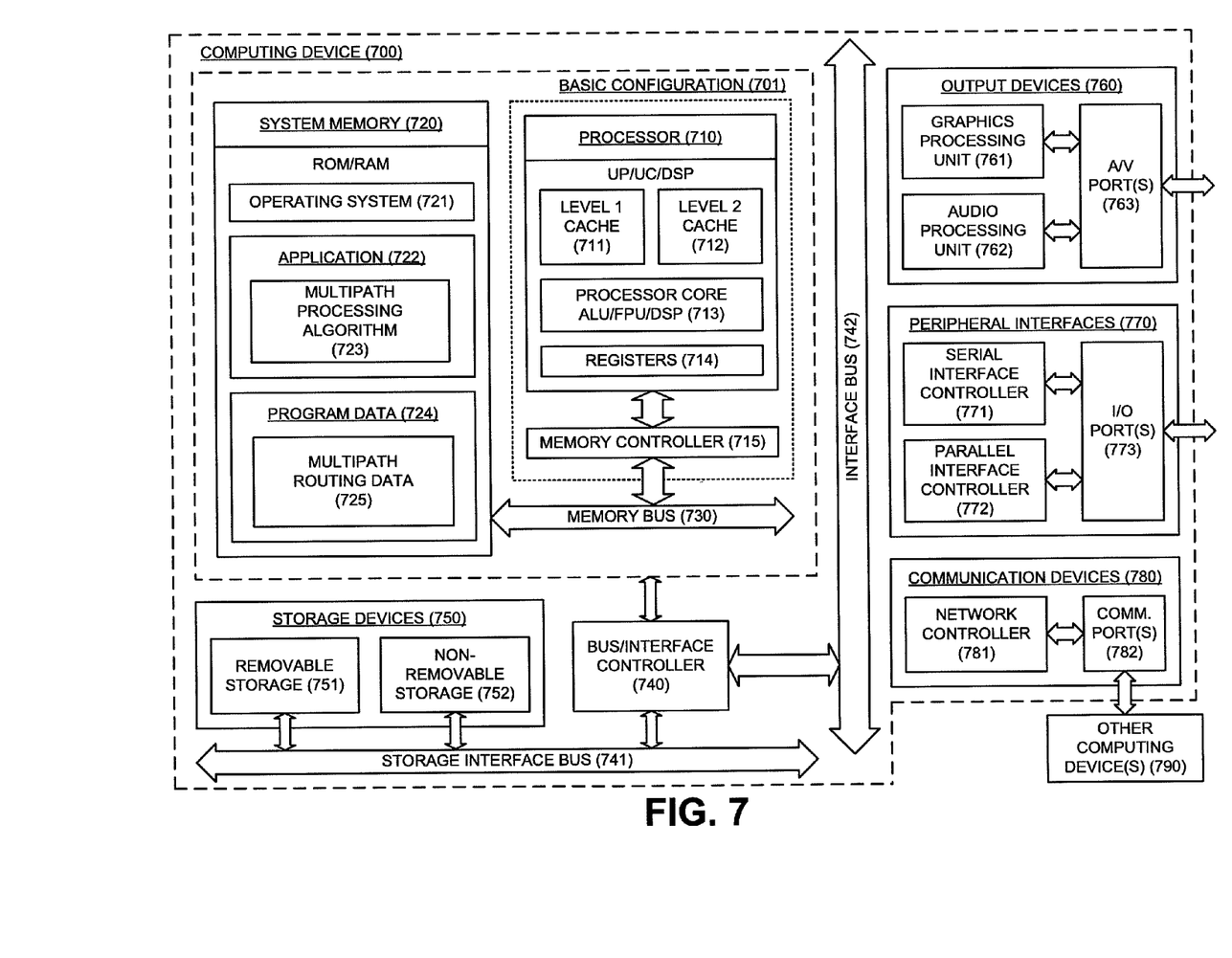
FIG. 7 is a block diagram illustrating an example embodiment of a build server.

FIG. 7 is a block diagram illustrating an example embodiment of a build server. In a very basic configuration 701, computing device 700 typically includes one or more processors 710 and system memory 720. A memory bus 730 can be used for communicating between the processor 710 and the system memory 720.

Depending on the desired configuration, processor 710 can be of any type including but not limited to a microprocessor (µP), a microcontroller (µC), a digital signal processor (DSP), or any combination thereof. Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof System memory 720 typically includes an operating system 721, one or more applications 722, and program data 724. Application 722 includes a multiple intent local targeted advertising processing algorithm 723. Program Data 724 includes multiple intent local targeted advertising data 725, as will be further described below. In some embodiments, application 722 can be arranged to operate with program data 724 on an operating system 721. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output devices 760 include a graphics processing unit 761 and an audio processing unit 762, which can be configured to communicate to various external devices such as a display or speakers via one or more A/V ports 763. Example peripheral interfaces 770 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An example communication device 780 includes a network controller 781, which can be arranged to facilitate communications with one or more other computing devices 790 over a network communication via one or more communication ports 782. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Exemplary embodiments are shown and described in the present disclosure. It is to be understood that the embodiments are capable of use in various other combinations and environments and are capable of changes or modifications within the scope of the inventive concept as expressed herein. Some such variations may include using programs stored on non-transitory computer-readable media to enable computers and/or computer systems to carry our part or all of the method variations discussed above. Such variations are not to be regarded as departure from the spirit and scope of the invention, and all such modifications as would be obvious to one skilled in the art are intended to be included within the scope of the following claims:

The invention claimed is:

1. A method performed by a data processing apparatus, comprising:
   creating a first compilation strategy, which is a plan created for compiling program code, for a first build, wherein a build, including the first build and a second build, changes programming code into executable code upon compilation;
   performing said first build using said first compilation strategy;
   computing a first checksum for configuration files identifying build dependencies associated with said first build, said first checksum is a global build checksum computed using one or more local build checksums which are computed based on a transitive closure of the first build configuration files, the transitive closure computed based on dependencies of the first build configuration files;
   storing said first compilation strategy and said first checksum;
   computing a second checksum for configuration files identifying build dependencies associated with said second build;
   determining if said second checksum is equal to said first checksum;
   in response to determining that said second checksum is not equal to said first checksum, creating a second compilation strategy, which is different from the first compilation strategy;
   storing said second compilation strategy and said second checksum, and performing said second build using said second compilation strategy; and
   in response to determining that said second checksum is equal to said first checksum, retrieving said first compilation strategy and performing said second build using said first compilation strategy.

2. The method of claim 1, further comprising determining that a local build checksum computed for the first build has not changed for said second build, and reusing parts of the first compilation strategy associated with the local build checksum in said second compilation strategy.

3. The method of claim 1, wherein file system information is sorted by pathname in order to compute local build checksums.

4. The method of claim 3, wherein said file system information includes a checksum.

5. The method of claim 1, wherein performing said first build using said first compilation strategy further comprises examining the contents of a configuration file to determine dependencies; and computing a local build checksum for each dependency of said configuration file.

6. The method of claim 1, wherein a local build checksum is computed for each configuration file of said computed transitive closure.

7. The method of claim 1, wherein the checksum is computed using an XOR function.

8. The method of claim 1, wherein computing said first checksum further comprises performing a deterministic sorting; computing a local build checksum with said deterministic sorting; and computing said first checksum using said local build checksum, said first checksum being a global build checksum.

9. A system comprising:
   one or more computers;
   a computer-readable medium coupled to the one or more computers having instructions stored thereon which, when executed by the one or more computers, causes the one or more computers to perform operations comprising:
   creating a first compilation strategy, which is a plan created for compiling program code, for a first build, wherein a build, including the first build and a second build, changes programming code into executable code upon compilation;
   performing said first build using said first compilation strategy;
   computing a first checksum for configuration files identifying build dependencies associated with said first build, said first checksum is a global build checksum computed using one or more local build checksums which are computed based on a transitive closure of the first build configuration files, the transitive closure computed based on dependencies of the first build configuration files;

storing said first compilation strategy and said first checksum;

computing a second checksum for configuration files identifying build dependencies associated with said second build;

determining if said second checksum is equal to said first checksum;

in response to determining that said second checksum is not equal to said first checksum, creating a second compilation strategy, which is different from the first compilation strategy;

storing said second compilation strategy and said second checksum, and performing said second build using said second compilation strategy; and in response to determining that said second checksum is equal to said first checksum, retrieving said first compilation strategy and performing said second build using said first compilation strategy.

10. The system of claim 9, the instructions further comprising instructions that, when executed, operate to cause the computer to perform further operations comprising:
determining that a local build checksum computed for the first build has not changed for said second build, and reusing parts of the first compilation strategy associated with the local build checksum in said second compilation strategy.

11. The system of claim 9, wherein file system information is sorted by pathname in order to compute local build checksums.

12. The system of claim 11, wherein said file system information includes a checksum.

13. The system of claim 9, wherein performing said first build using said first compilation strategy further comprises examining the contents of a configuration file to determine dependencies; and computing a local build checksum for each dependency of said configuration file.

14. The system of claim 9, wherein a local build checksum is computed for each configuration file of said computed transitive closure.

15. The system of claim 9, wherein the checksum is computed using an XOR function.

16. The system of claim 9, wherein computing said first checksum further comprises performing a deterministic sorting; computing a local build checksum with said deterministic sorting; and computing said first checksum using said local build checksum, said first checksum being a global build checksum.

17. A non-transitory computer-readable medium encoded with a computer program comprising instructions that, when executed, operate to cause a computer to perform operations comprising:
creating a first compilation strategy, which is a plan created for compiling program code, for a first build, wherein a build, including the first build and a second build, changes programming code into executable code upon compilation;
performing said first build using said first compilation strategy;
computing a first checksum for configuration files identifying build dependencies associated with said first build, said first checksum is a global build checksum computed using one or more local build checksums which are computed based on a transitive closure of the first build configuration files, the transitive closure computed based on dependencies of the first build configuration files;
storing said first compilation strategy and said first checksum;
computing a second checksum for configuration files identifying build dependencies associated with said second build;
determining if said second checksum is equal to said first checksum;
in response to determining that said second checksum is not equal to said first checksum, creating a second compilation strategy, which is different from the first compilation strategy;
storing said second compilation strategy and said second checksum, and performing said second build using said second compilation strategy; and
in response to determining that said second checksum is equal to said first checksum, retrieving said first compilation strategy and performing said second build using said first compilation strategy.

18. The non-transitory computer-readable medium of claim 17, the instructions further comprising instructions that, when executed, operate to cause the computer to perform further operations comprising: determining that a local build checksum computed for the first build has not changed for said second build, and reusing parts of the first compilation strategy associated with the local build checksum in said second compilation strategy.

19. The non-transitory computer-readable medium of claim 17, wherein file system information is sorted by pathname in order to compute local build checksums.

20. The non-transitory computer-readable medium of claim 19, wherein said file system information includes a checksum.

21. The non-transitory computer-readable medium of claim 17, wherein performing said first build using said first compilation strategy further comprises examining the contents of a configuration file to determine dependencies; and computing a local build checksum for each dependency of said configuration file.

22. The non-transitory computer-readable medium of claim 17, wherein a local build checksum is computed for each configuration file of said computed transitive closure.

23. The non-transitory computer-readable medium of claim 17, wherein the checksum is computed using an XOR function.

24. The non-transitory computer-readable medium of claim 17, wherein computing said first checksum further comprises performing a deterministic
performing a deterministic sorting;
computing a local build checksum with said deterministic sorting; and
computing said first checksum using said local build checksum, said first checksum being a global build checksum.

* * * * *